(12) United States Patent
Reisch et al.

(10) Patent No.: US 7,232,396 B2
(45) Date of Patent: Jun. 19, 2007

(54) CONE RING TRANSMISSION

(75) Inventors: Matthias Reisch, Ravensburg (DE); Christian Müller, Kritzmow (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 179 days.

(21) Appl. No.: 11/039,055

(22) Filed: Jan. 20, 2005

(65) Prior Publication Data

US 2005/0215391 A1    Sep. 29, 2005

(30) Foreign Application Priority Data

Jan. 24, 2004    (DE) .................... 10 2004 003 691

(51) Int. Cl.
*F16H 37/02* (2006.01)
*F16H 15/42* (2006.01)

(52) U.S. Cl. ........................................ 475/214; 476/53

(58) Field of Classification Search ................ 475/198, 475/207, 214, 320; 476/53, 52, 51
See application file for complete search history.

(56) References Cited

U.S. PATENT DOCUMENTS 760,460 A      5/1904  Leighton 6,063,002 A *  5/2000  Nobumoto et al. ............ 477/41
6,093,131 A *  7/2000  Rohs ............................. 476/53
7,048,667 B2 * 5/2006  DeVincent et al. .......... 475/214
2003/0069106 A1* 4/2003  Miyata et al. ............... 475/216

FOREIGN PATENT DOCUMENTS

EP          0 878 641 A1    11/1998

* cited by examiner

*Primary Examiner*—Richard M. Lorence
*Assistant Examiner*—Edwin A. Young
(74) *Attorney, Agent, or Firm*—Davis Bujold & Daniels, P.L.L.C.

(57) ABSTRACT

A cone ring transmission, especially for motor vehicles with a front, transverse drive is proposed, having two cones in opposed alignment to one another, rotating on two shafts, the cones being, namely a primary cone and a secondary cone, with an adjustment ring engaging both cones therebetween, the ring contacting one cone and circumferentially encompassing the other cone, with a mechanism to provide ratio adjustment for the adjustment ring, having an arrangement which binds the output drive shaft, i.e. the shaft of the secondary cone with a differential of the motor vehicle and with a start-up element, which binds one of the cones with the motor of the motor vehicle, whereby the torque from the output drive shaft is transmitted to a differential by way of a gear train.

21 Claims, 7 Drawing Sheets

CONE RING TRANSMISSION

This application claims priority from German Application Serial No. 10 2004 003 691.8 filed Jan. 24, 2004.

FIELD OF THE INVENTION

The present invention concerns a cone ring transmission, especially for a front, transverse installation in a motor vehicle, which transmission possesses two rotating cones, which are oppositely aligned to each other, on two shafts, which shafts rotated in a counter sense to one another, the said rotating cones being a primary cone and a secondary cone.

BACKGROUND OF THE INVENTION

EP A 878 641 discloses a stepless cone ring transmission, which has two frictionally conical rotors, located at a radially separating distance from each other and which are relatively oppositely aligned to one another and have the same conical angle. Between the conical frictional rotors is placed a frictional ring, which fully occupies the space between the two rotors. The ring circumferentially encompasses one of the conical rotors and is confined in a cage.

The cage consists of a framing, which is constructed from two transverse beams and two parallel axles in the interior. An adjustment bridge is placed on the axles, which bridge is furnished with guide rollers, which engage the frictional ring on both sides, in order to give this ring the necessary axial alignment. The cage is again pivotal on a vertical axle, whereby this vertical axle lies in a specified plane which also passes through the axles of the frictional conical rotors. If the cage is angularly moved a few degrees, then the frictional drive causes an axial displacement of the adjustment bridge, and hence, a change in the ratio relationships of the conical rotors.

Such a cone ring transmission adapts itself, in accord with this disclosure, especially for installation in motor vehicles, and indeed even for front-end as well as rear drive.

The purpose of the present invention is, to create a cone ring transmission, which has such a small requirement for installation space, that it is suitable both for front as well as rear installation in a motor vehicle. In addition to this, the invented transmission is to exhibit an optimal degree of efficiency.

SUMMARY OF THE INVENTION

Accordingly, a cone ring transmission, especially for a transverse, front installation in a motor vehicle is proposed, with two cones, oppositely aligned to one another and each mounted on a respective shaft, wherein one is designated as a primary cone, and the other as a secondary cone. An adjustment ring is provided, which stands in engagement with the two cones by being interposed therebetween and circumferentially encompassing one cone. The ring is provided with an axial displacement means for rotational speed ratio adjustment. Further, another arrangement connects the output shaft, that is, the shaft of the secondary cone, with a differential of the motor vehicle and with a start-up element. The start-up element binds one of the cones with the motor of the vehicle, whereby the torque from the output shaft 7, i.e., the shaft 7 of the secondary cone, is transmitted to the differential 9 of the motor vehicle by means of a gear train, so that no chain drive is required.

In this way, the gearing of a planetary gear set and/or an auxiliary gear train can include a reverse shifting stage, that is to say, a direction of rotation reversal. This is accomplished by an appropriate shifting mechanism (for instance, this shifting mechanism being a releasable connection with the housing of an element of the planetary gear set and/or of the auxiliary gear train, or of further means to carry out this purpose). Where forward motion is concerned, it is possible that appropriate shifting elements can be employed, such as, for example, a dog clutch, synchronization or disk clutches.

For an additional embodiment, provision has been made, that the torque from the output shaft, that is, the shaft of the secondary cone, can be transmitted to the differential by means of a chain drive, in which case, between the chain drive and the differential, in the direction of power flow, a planetary gear set and/or an auxiliary gear train can be interposed.

In accord with the invention, the planetary gear set can be designed as a plus or minus set. The secondary cone can be installed in the motor vehicle, in one development of the invention, directly underneath the primary cone, or be offset therefrom. In an alternative arrangement, the primary cone can be installed underneath the secondary cone or again offset therefrom.

The adjustment ring can circumferentially encompass either the primary cone or the secondary cone, whereby, however, experience has shown that it is of advantage if the adjustment ring encircles that cone, which, in accord with the installation is placed higher in the motor space, since, when so placed, it is free from contamination in the oil sump.

Further within the confines of the invention, an improvement can be provided, in that the axle, which runs through the center point of the circle formed by the adjustment ring and perpendicular to the plane extending through the adjustment ring, can be operationally aligned at an angle $\alpha$ to the shaft of the cone.

As a start-up element, a dry clutch or a wet disk clutch can be installed, whereby the start-up element can be provided with a torsion damper.

In order to reduce the required installation space, it is possible, that within the interior of the motor cavity, which the adjustment ring needs for its ratio displacements, an aggregate for the motor or the cone transmission can be furnished. This aggregate can consist of, for example, a heat exchanger, a shifting mechanism for ratio selection, or an activation agent for the start-up element.

The installation space, in accord with the invention, can be further reduced, in that those components, which are necessary for shifting into the reverse gear, can be placed inside of the secondary cone.

BRIEF DESCRIPTION OF THE DRAWINGS

The invention will now be described, by way of example, with reference to the accompanying drawings in which.

DETAILED DESCRIPTION OF THE INVENTION

Figure 1:
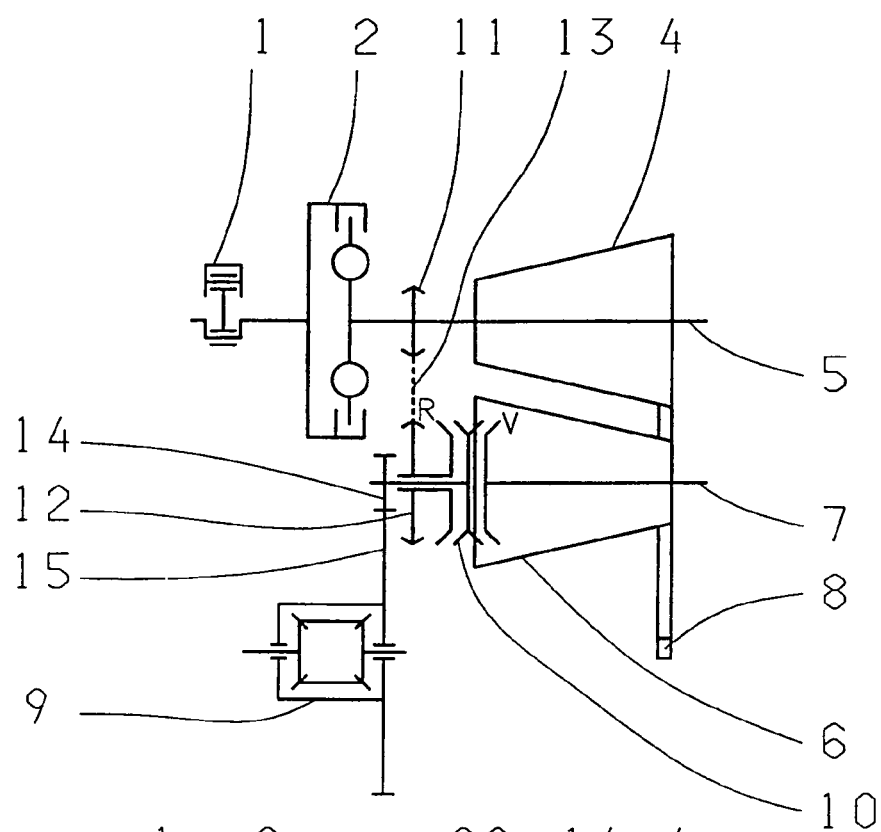
FIG. 1 is a diagrammatic representation of an embodiment of a cone ring transmission.

In the embodiment shown in FIG. 1, the secondary cone 6 is placed, according to the installation of the cone ring transmission, above the primary cone 4. The gear arrangement possesses an auxiliary gear train 10 which is placed on the shaft 7 of the secondary cone 6, whereby the auxiliary gear train 10 is in connection through a sprocket 12 and a chain 13 with a sprocket 11 on the shaft 5 of the primary cone 4. This is an arrangement in which shifting into reverse is possible. Further, on the shaft 7 of the secondary cone 6 is located a gear 14, which, coacting with a gear 15, engages the differential 9. The start-up element 2, in accord with FIG. 1, is a dry clutch, which is provided with a torsion damper.

Figure 2:
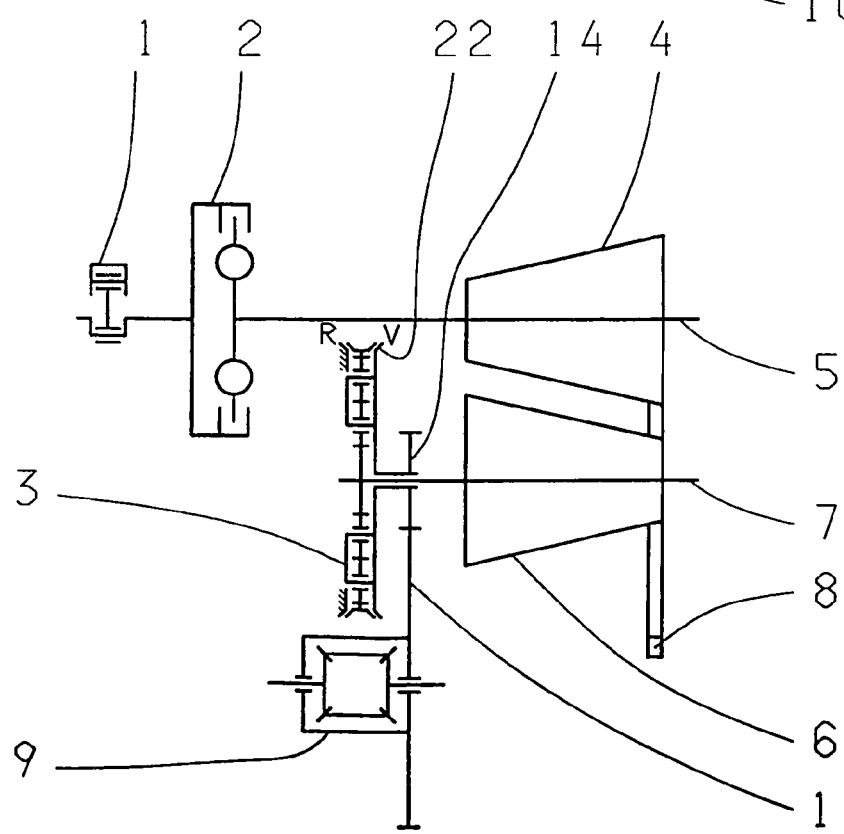
FIG. 2 is a diagrammatic representation of an embodiment of a cone ring transmission including a planetary gear set and an adjustment ring encircling a secondary cone.

In the case of the embodiment as shown in FIG. 2, the secondary cone 6, in accord with the installation of the cone ring transmission in the motor vehicle, is placed above the primary cone 4 and the adjustment ring 8 encircles the secondary cone 6. The gear arrangement includes a planetary gear set 3, which is placed on the shaft 7 of the secondary cone 6 and is provided with an arrangement 22 for the reversal of the direction of rotation. Advantageously, for effecting the reversal of direction, an element of the planetary gear set 3 is affixed to the housing. In this situation, the sun gear of the planetary gear set 3 is mounted to be rotatably affixed to the shaft 7. The planetary cage is connected to a gear 14, which engages itself with the gear 15 of the differential 9. The start-up element 2 is a dry clutch, which is provided with a torsion damper. The transmission in FIG. 3, differentiates itself from the transmission depicted in FIG. 2, in that the adjustment ring 8 encircles the primary cone 4.

Figure 3:
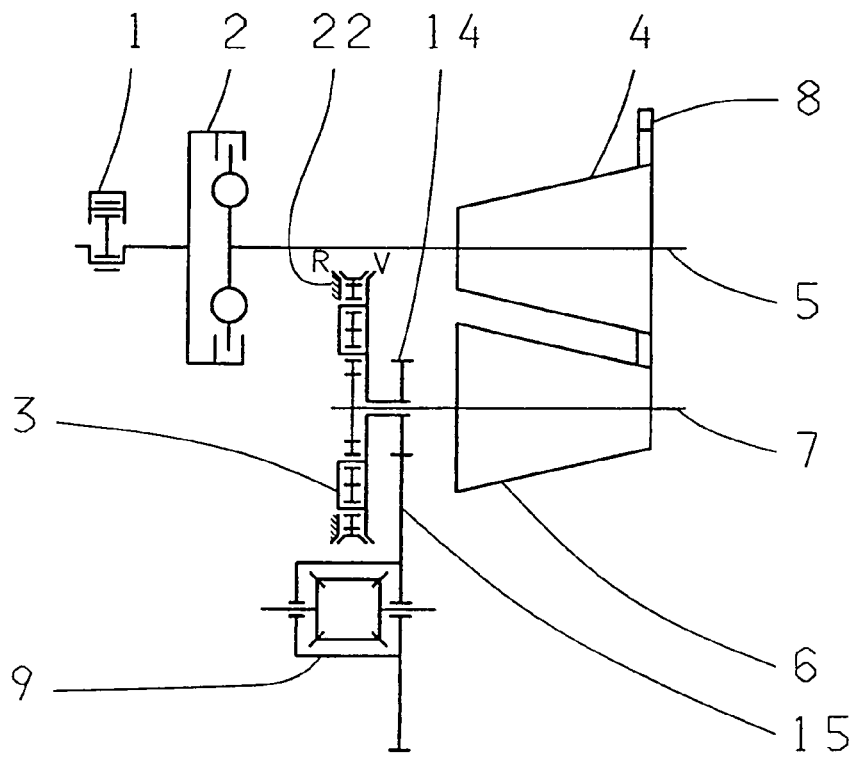
FIG. 3 is a diagrammatic representation of an embodiment of a cone ring transmission including a planetary gear set and an adjustment ring encircling a primary cone.

The transmission in FIG. 3, differentiates itself from the transmission depicted in FIG. 2, in that the adjustment ring 8 encircles the secondary cone 6.

Figure 4:
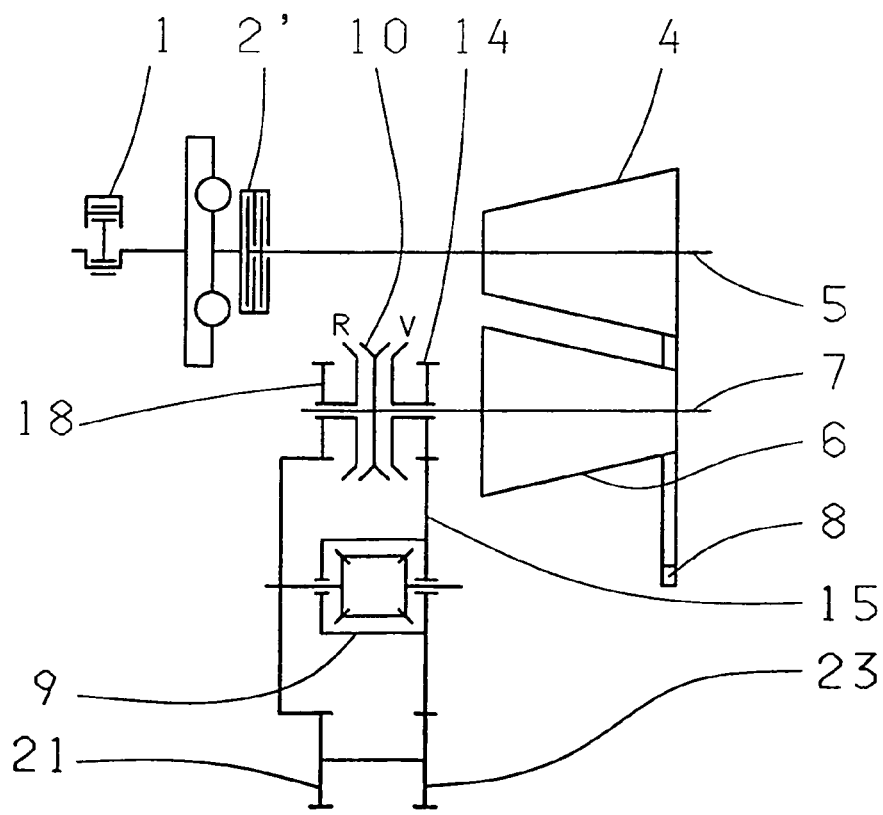
FIG. 4 is a diagrammatic representation of an embodiment of a cone ring transmission including an auxiliary gear train and an adjustment ring encompassing a secondary cone.

In the case of the embodiment shown in FIG. 4, the secondary cone 6, in accord with the installation of the cone ring transmission in the motor vehicle, is placed above the primary cone 4, whereby the adjustment ring 8 circumferentially encompasses the secondary cone 6. An auxiliary gear train 10 is again provided and is placed on the shaft 7 of the secondary cone 6. In this case, for forward travel, the auxiliary gear train 10 stands in engagement with a first gear 14 which meshes with a gear 15 of the differential 9. For reverse travel, the auxiliary gear train 10, which is driven by means of a shaft in gear 23, engages itself with the gear 15 of the differential 9. In this embodiment the start-up element 2' is a wet disk clutch, which is provided with a torsion damper and connected with an electromechanical activation.

Figure 5:
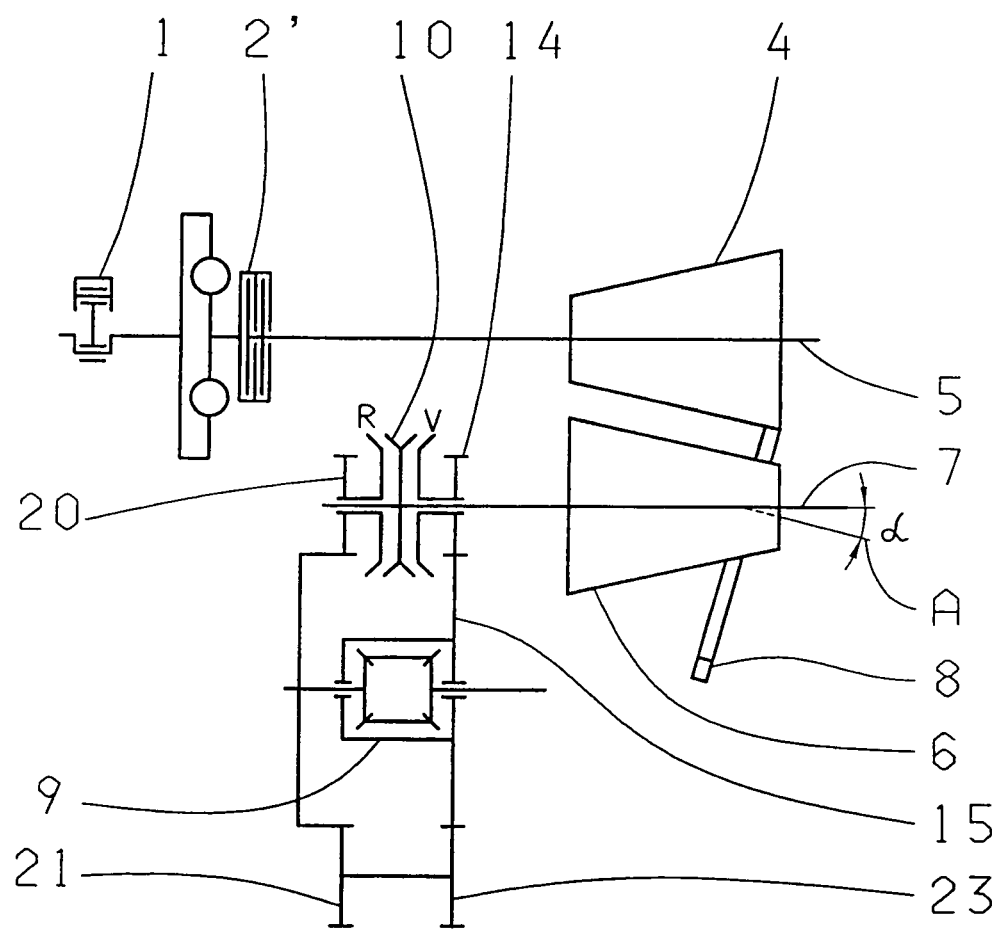
FIG. 5 is a diagrammatic representation of a second embodiment of a cone ring transmission including an auxiliary gear train and an adjustment ring encompassing a secondary cone.

The transmission illustrated in FIG. 5, differentiates itself from the transmission of FIG. 4, in that the axis A which penetrates the center point of the circle formed by the adjustment ring 8, and which axis is perpendicular to the plane defined by the adjustment ring 8, runs at an angle α to the axis of the shaft 7 of the cone 6.

Figure 6:
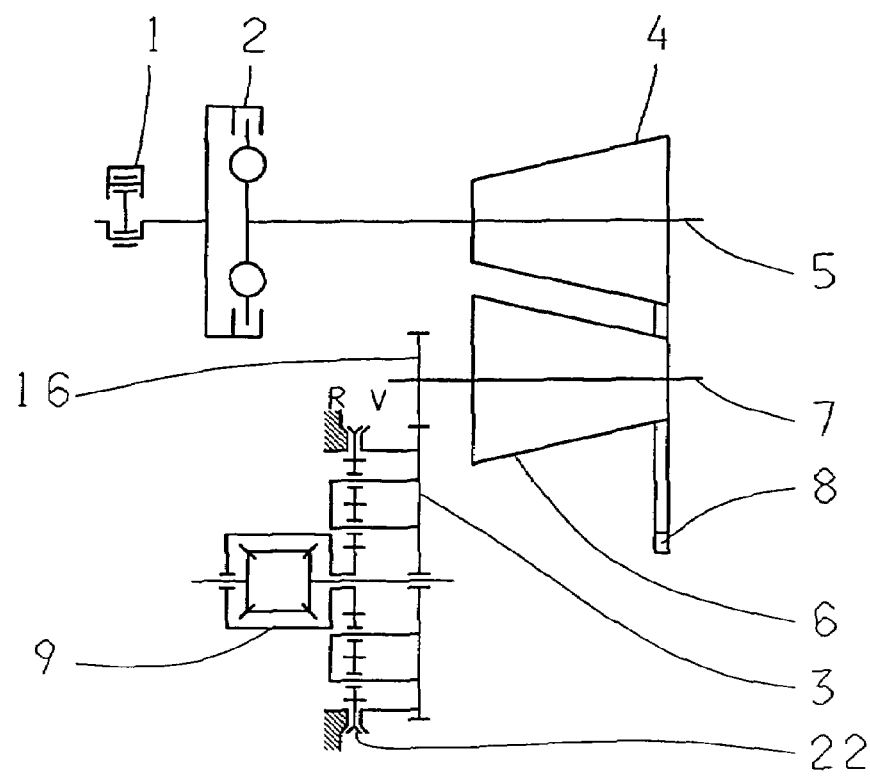
FIG. 6 is a diagrammatic representation of another embodiment of a cone ring transmission including a planetary gear set and an adjustment ring encircling a secondary cone.
Figure 7:
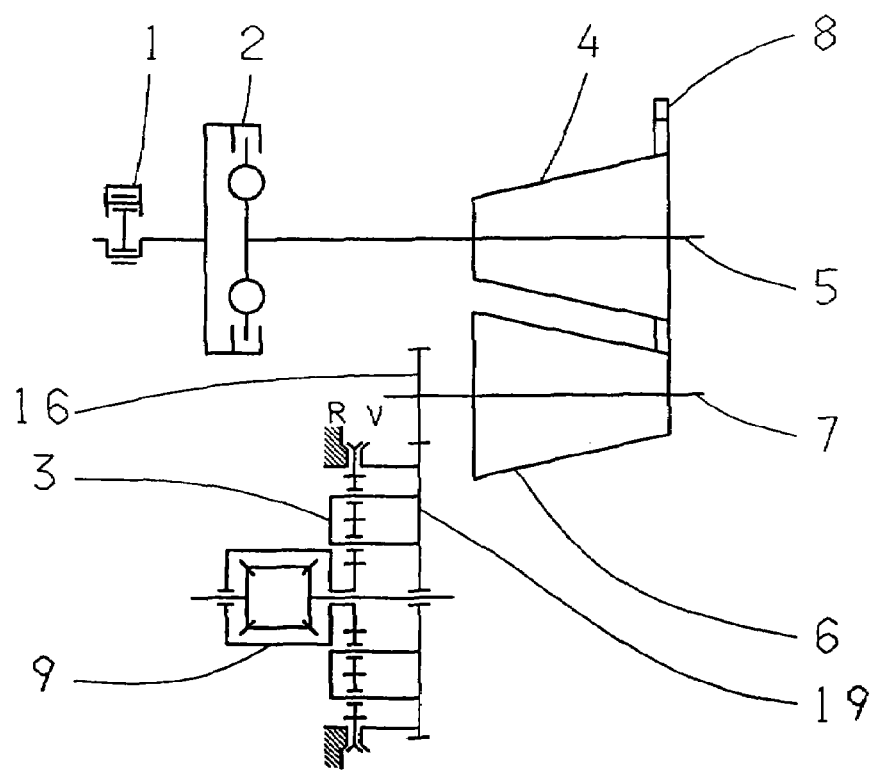
FIG. 7 is a diagrammatic representation of another embodiment of a cone ring transmission including a planetary gear set and an adjustment ring encircling a primary cone.

In FIG. 6 we are shown a transmission, wherein the secondary cone 6, in accord with the installation in the motor vehicle, is above the primary cone 4 and offset to one side thereof, whereby the adjustment ring 8 circumferentially encircles the secondary cone 6. In addition, the gearing has a gear 16, which is rotatably affixed to the shaft 7 of the secondary cone 6. The gear 16 further engages itself with an element of the planetary gear set 3, preferably with the cage, advantageously by means of a gear 19. An additional element of the planetary gear set 3, advantageously the sun gear, is rotatably affixed with the shaft of the differential 9. A reverse of the direction of rotation is accomplished advantageously by the optional coupling of an element of the planetary gear set to the housing. In accord with the invention, the adjustment ring 8, can circumferentially encompass the primary cone instead of the secondary cone. This configuration is the object of FIG. 7.

Figure 8:
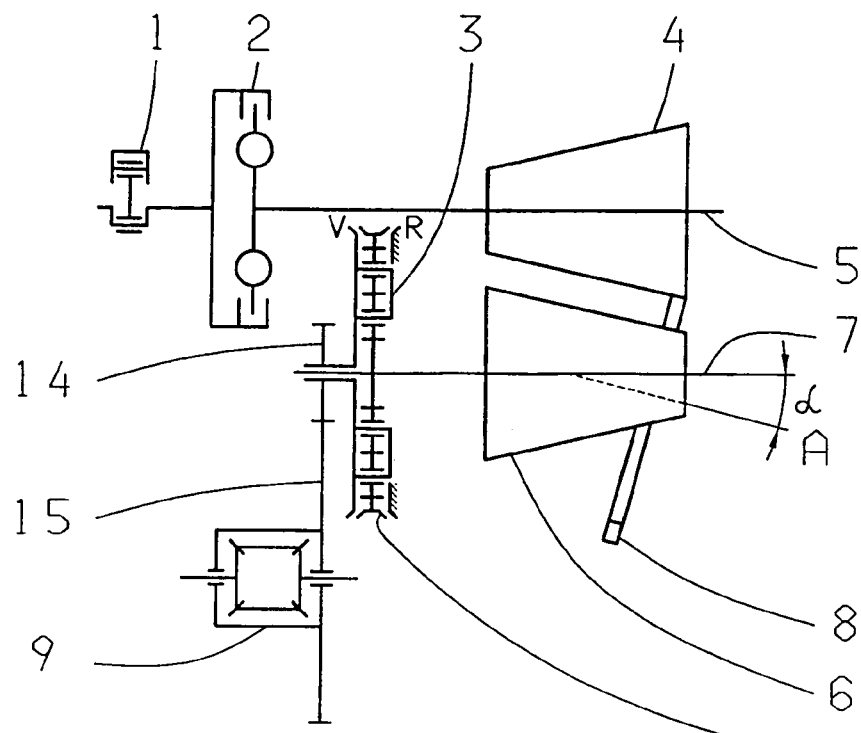
FIG. 8 is a diagrammatic representation of yet another embodiment of a cone ring transmission including a planetary gear set and an adjustment ring encircling a secondary cone.

In the embodiment shown in FIG. 8, the secondary cone 6, in accord with the installation of the cone ring transmission in the motor vehicle, is advantageously placed above the primary cone 4 and laterally offset therefrom, whereby the adjustment ring 8 circumferentially encompasses the secondary cone 6 and the axis A which penetrates the center point of the circle formed by the adjustment ring 8, and which axis is perpendicular to the plane established by the adjustment ring 8, runs at an angle α to the axis of the shaft 7 of the cone 6. The arrangement of the gearing includes a planetary gear set 3, the sun gear of which is rotatably affixed to the shaft 7 of the secondary cone 6. On the power take-off side, advantageously, the cage of the planetary gear set 3 is connected with a gear rotatably affixed also to the shaft 7, which engages with a gear 15 of the differential 9. For the start-up element 2, a dry clutch is provided, which is advantageously provided with a torsion damper.

Figure 9:
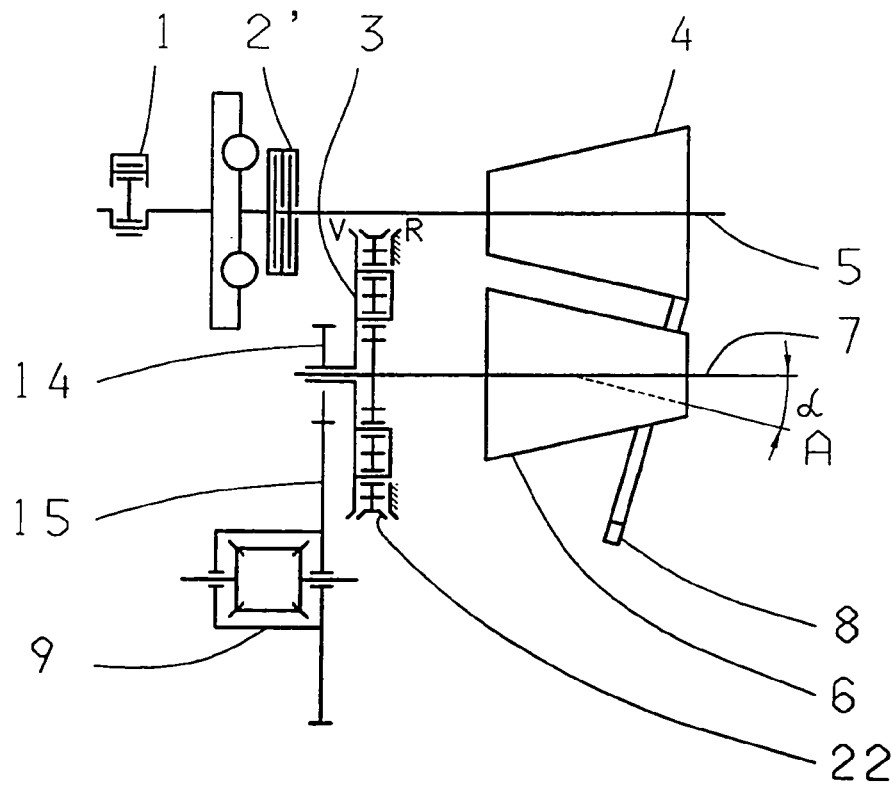
FIG. 9 is a diagrammatic representation of a further embodiment of a cone ring transmission including a planetary gear set and an adjustment ring encircling a secondary cone.

The embodiment shown in FIG. 9 differentiates itself from the operational method of FIG. 8, in that, as a start-up element 2', a wet disk clutch is provided.

Figure 10:
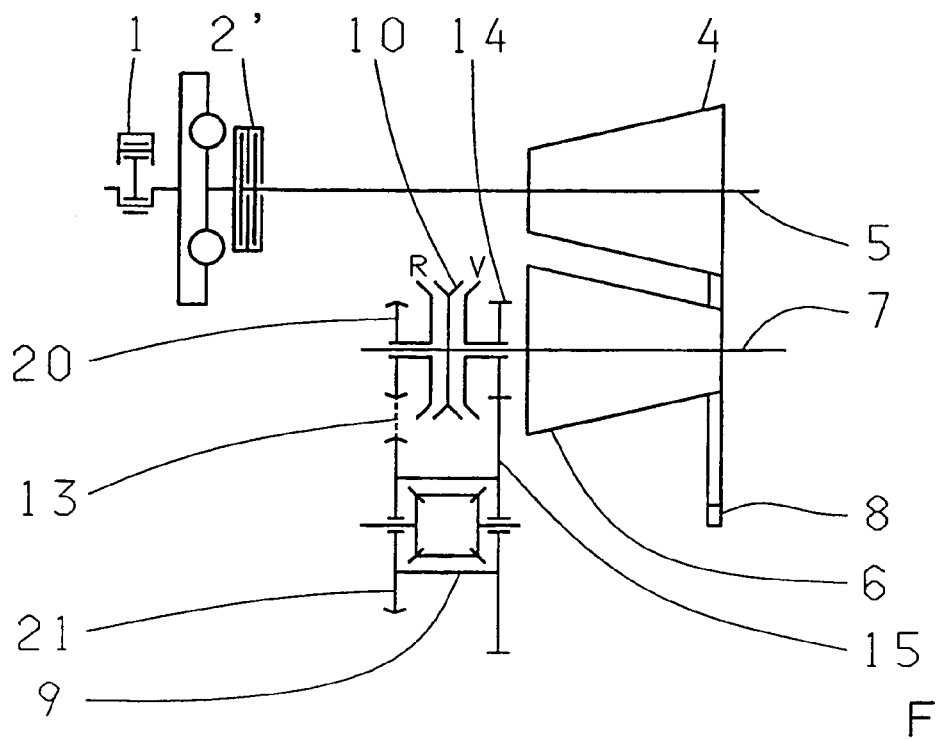
FIG. 10 is a diagrammatic representation of a further embodiment of a cone ring transmission including an auxiliary gear train.

In FIG. 10, an invented transmission is shown, wherein the secondary cone 6, in accord with the installation of the cone ring transmission in the motor vehicle, is to be found above the primary cone 4 and laterally offset therefrom. In this case, the adjustment ring 8 circumferentially encompasses the secondary cone 6. The gear arrangement of this embodiment has an auxiliary gear train 10, which is placed on the shaft 7 of the secondary cone 6. In this case, for a forward speed shift, a first gear 14 of the auxiliary gear train 10 engages itself with the first gear 15 of the differential 9. To achieve a reverse shift, a sprocket 20 of the auxiliary gear train 10 connects through a chain 13 with a sprocket 21 of the differential 9. As a start-up element 2', a wet disk clutch is provided, which is advantageously provided with a torsion damper and with an electromechanical activation.

Figure 11:
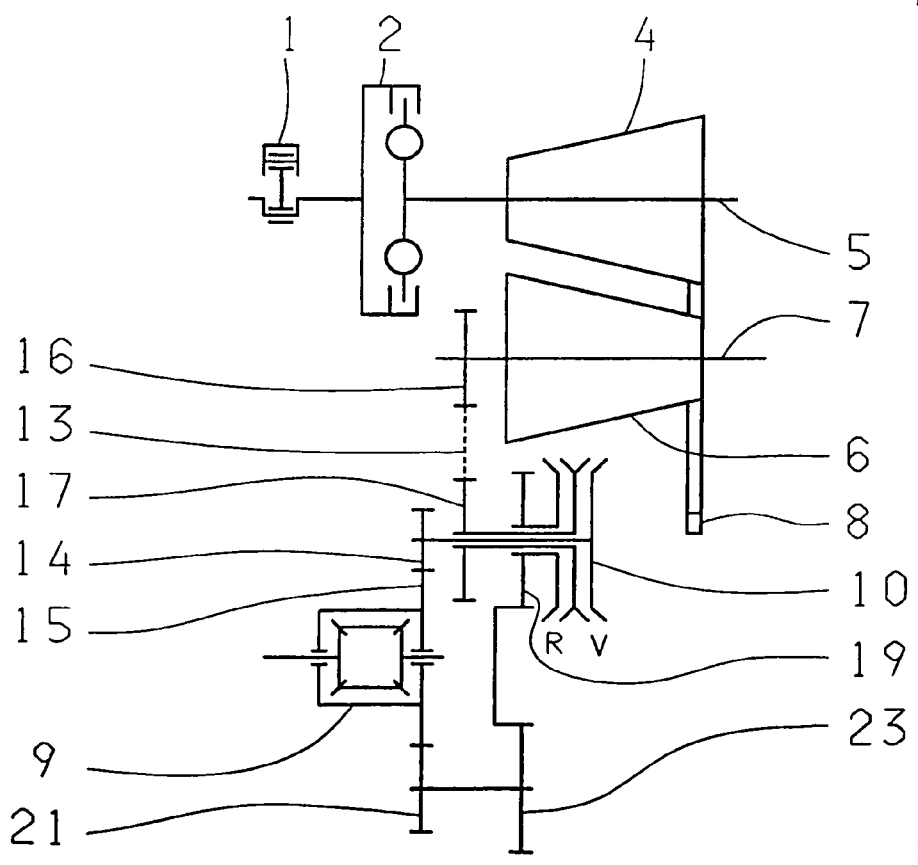
FIG. 11 is a diagrammatic representation of yet another embodiment of a cone ring transmission including a chain drive and an adjustment ring encircling a secondary cone.

In FIG. 11 is shown an embodiment example, wherein the secondary cone 6, in accord with the installation of the cone ring transmission in the motor vehicle, is placed advantageously above and laterally offset from the primary cone 4, whereby the adjustment ring 8 circumferentially encompasses the secondary cone 6 and for the transmission of the torque to the differential, a chain drive is provided. In this case, on the shaft 7 of the secondary cone 6, a sprocket 16 is placed, which, by means of a chain 13 stands in communication with a sprocket 17 of an auxiliary gear train 10. For forward movement, auxiliary gear train 10 connects, through a gear 14 with a gear 15 of the differential 9, while for reverse motion, a gear 19 meshes with a gear 23, which is driven by means of a gear 21 which engages the gear 15 of the differential.

Figure 12:
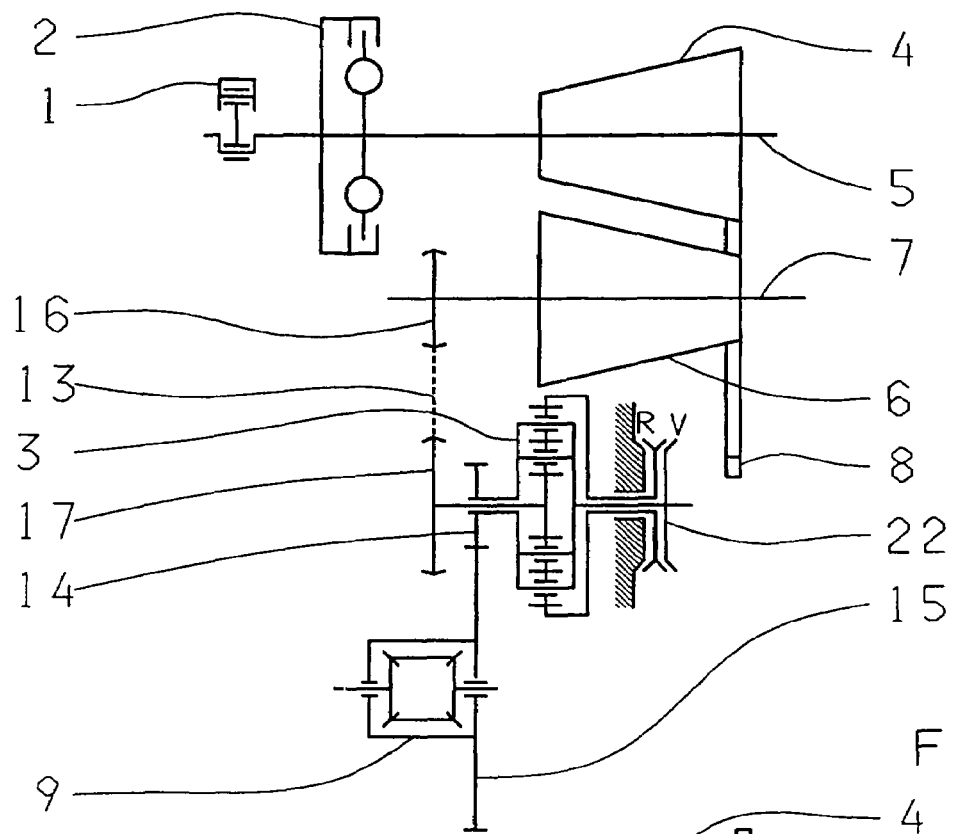
FIG. 12 is a diagrammatic representation of an additional embodiment of a cone ring transmission, having a planetary gear set with a change of direction means.

In the transmission as illustrated in FIG. 12, the secondary cone 6, in accord with the installation of the cone ring transmission in the motor vehicle, is placed advantageously above the primary cone 4 and is laterally offset therefrom wherein the adjustment ring 8 circumferentially encompasses the secondary cone 6. For the transmission of the torque to the differential, a sprocket 16 is provided, which is placed on the shaft 7 of the secondary cone 6, and which connects with a sprocket 17 by means of a chain 13. The sprocket 17 is rotatably affixed to the sun gear of a planetary gear set 3. The planetary gear set 3 is provided with a change of direction means 22 for reversing the direction of rotation, wherein, for the reversal of direction, advantageously the internal gear can be coupled to the housing. Further, the planetary gear set 3, on the power out-take side is connected with a gear 14, which is engaged with the gear 15 of the differential 9. As a start-up element 2, a dry clutch is provided, which is provided with a torsion damper.

Figure 13:
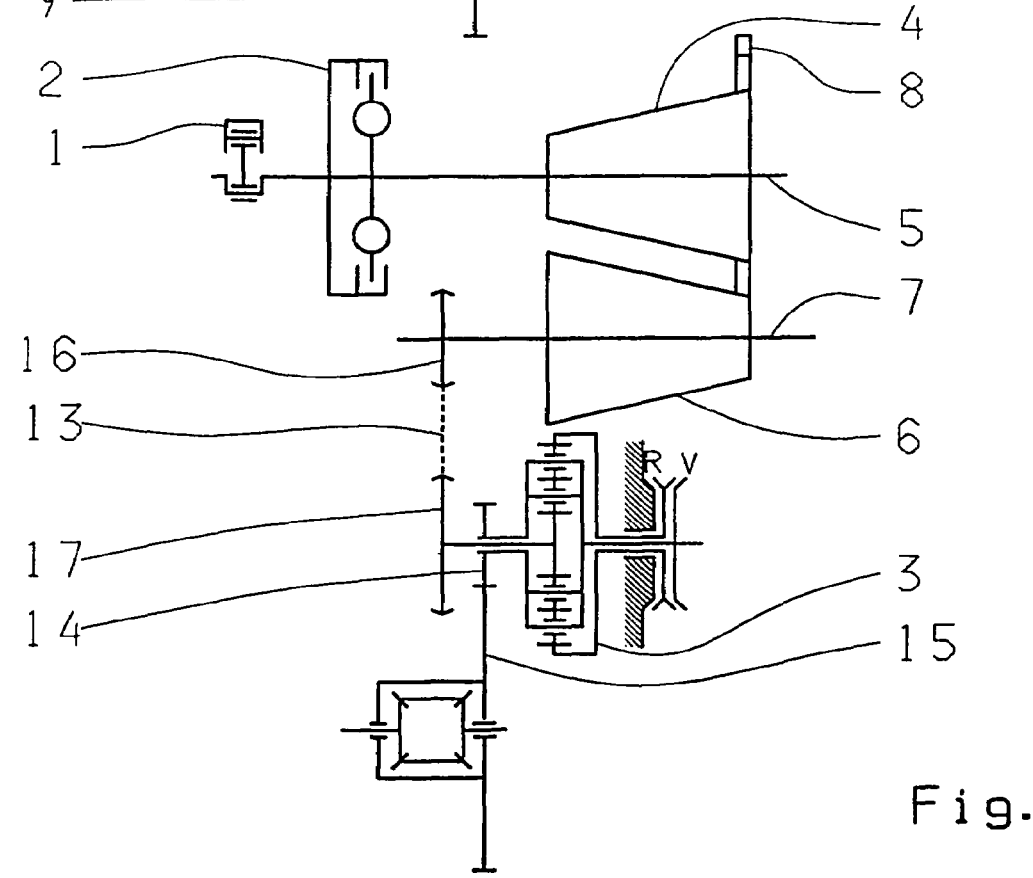
FIG. 13 is a diagrammatic representation of yet another embodiment of a cone ring transmission, having a planetary gear set with a change of direction means.

In the embodiment depicted in FIG. 13, it is possible that the secondary cone 6, in accord with the installation in the motor vehicle, is placed underneath the primary cone 4 and is laterally offset therefrom, whereby the difference to the presentation in FIG. 12 can be found in that, the adjustment ring 8 circumferentially encompasses the primary cone 4.

In the case of all illustrated examples of embodiments, which possess a planetary gear set, this can be designed as a plus or minus gear set.

Obviously, any designed construction, especially any spatial arrangement of the components themselves as well as to one another and to the extent the construction is advantageous, falls under the protection of the present claims, without influence on the function of the transmission, as this is given in the claims, even when these designs are not explicitly presented in the figures nor in the description. Also, the invention is not limited to cones, but additional, rotationally symmetric bodies may be provided.

REFERENCE NUMERALS

1 Motor
2 (or 2') Start-up element
3 Planetary gear set
4 Primary cone
5 Shaft
6 Secondary cone
7 Shaft
8 Adjustment ring
9 Differential
10 Auxiliary gear train
11 Sprocket for chain
12 Sprocket for chain
13 Chain
14 Gear
15 Gear
16 Sprocket for chain
17 Sprocket for chain
18 Gear
19 Gear
20 Sprocket for chain
21 Sprocket for chain
22 Arrangement for reversal of rotational direction
23 Gear

The invention claimed is:

1. A cone ring transmission for a transverse installation in a motor vehicle, having a primary rotating cone, mounted on a first shaft (5) arranged in opposite alignment with a secondary rotating cone mounted on an output shaft (7), an adjustment ring engaging the primary cone and the secondary cone with said ring circumferentially encompassing one of the primary cone and the secondary cone and the adjustment ring being axially displaceable to set gear ratios, the transmission further has a gear arrangement with a single shifting element to connect the output shaft of the secondary cone with a differential of the motor vehicle, the transmission has a start-up element, which couples the primary cone to a motor of the vehicle, and a torque load from the output shaft (7) of the secondary cone is transmitted to the differential (9) by the gear arrangement.

2. The cone ring transmission according to claim 1, wherein the gear arrangement comprises an auxiliary gear train (10) which, along with the single shifting element, is located in a flow of power between the shaft (7) of the secondary cone (6) and the differential (9).

3. The cone ring transmission according to claim 2, wherein the auxiliary gear train (10) is placed on the output shaft (7) of the secondary cone (6), a first sprocket (12) and a chain (13), and a second sprocket (11) placed on the first shaft (5) of the primary cone (4) enables shifting into a reverse gear, and the auxiliary gear train (10), by a second gear (14) engages a forward gear (15) of the differential (9).

4. The cone ring transmission according to claim 2, wherein the auxiliary gear train (10) is placed on the output shaft (7) of the secondary cone (6), and the auxiliary gear train (10), for forward motion, is placed in connection with a first gear (14) which engages a third gear (15) of the differential (9) and the auxiliary gear train (10), for reverse motion, is placed in connection with a second gear (18), which engages a sprocket (21), which engages a third shaft which engages a fourth gear (23) on said third shaft which engages the third gear (15) of the differential (9).

5. The cone ring transmission according to claim 2, wherein the auxiliary gear train (10) is placed on the output shaft (7) of the secondary cone (6), a first gear (14) of the auxiliary gear train (10), for forward travel, engages a gear (15) of the differential (9) and a sprocket (20) of the auxiliary gear train (10), for reverse travel, engages by a chain (13), a sprocket (21) of the differential (9).

6. The cone ring transmission according to claim 1, wherein the gear arrangement is located in a flow of power between the shaft (7) of the secondary cone (6) and the differential (9) and comprises one of a shiftable positive planetary gear set (3) and a shiftable negative planetary gear set.

7. The cone ring transmission according to claim 6, wherein the shiftable planetary gear set (3) is placed on the output shaft (7) of the secondary cone (6), such that the shiftable planetary gear set (3), by a first gear (14), connects with a gear (15) of the differential (9).

8. The cone ring transmission according to claim 7, wherein a sun gear of the shiftable planetary gear set (3) is rotatably affixed to the output shaft (7) of the secondary cone (6) and a cage of the shiftable planetary gear set (3) forms an output of the shiftable planetary gear set (3).

9. The cone ring transmission according to claim 6, wherein the gear arrangement includes another gear (16), which is placed on the output shaft (7) of the secondary cone (6) and communicates with a further gear of the planetary gear set (3), whereby the planetary gear set (3) is placed on an axle of the differential (9).

10. The cone ring transmission according to claim 1, wherein
the gear arrangement comprises a chain drive; and
one or more of a planetary gear set (3) and an auxiliary gear train (10) is interposed between the chain drive and the differential (9) in a direction of power flow and enables reverse motion, and
on the output shaft (7) of the secondary cone (6) is placed a first sprocket (16), which, by a chain (13) is engaged with a second sprocket (17) of the auxiliary gear train (10) for forward travel, by means of a first gear (14) which is engaged with a gear (15) of the differential (9) and to execute reverse travel, the auxiliary gear train (10), by an additional gear (19) engages a further gear (23), which, by another shaft drives another gear (21) which in turn engages the gear (15) of the differential (9).

11. The cone ring transmission according to claim 10, wherein the first sprocket (16) is placed upon the output shaft (7) of the secondary cone (6), the first sprocket (16) by the chain drive (13) is in connection with the second sprocket (17) of a second shaft, upon which the planetary gear set (3) is mounted, a cage of the planetary gear set (3), by the gear (15) of the differential (9) is engaged with the differential (9), and a sun gear of the planetary gear set (3) is rotatably affixed to a third shaft.

12. The cone ring transmission according to claim 1, wherein the secondary rotating cone (6) is placed underneath the primary rotating cone (4) and one of directly beneath the primary rotating cone (4) or offset therefrom.

13. The cone ring transmission according to claim 1, wherein the primary rotating cone (4) is placed underneath the secondary rotating cone (6) and directly beneath the secondary rotating cone (6) or offset therefrom.

14. The cone ring transmission according to claim 1, wherein the adjustment ring (8) circumferentially encompasses the primary rotating cone (4).

15. The cone ring transmission according to claim 1, wherein the adjustment ring (8) circumferentially encompasses the secondary rotating cone (6).

16. The cone ring transmission according to claim 1, wherein the adjustment ring (8) circumferentially encompasses one of the primary or the secondary rotating cones, which is placed higher.

17. The cone ring transmission according to claim 1, wherein an axis (A), which penetrates through a center point of a circle formed by the adjustment ring (8) and is perpendicular to a plane defined by the encircling adjustment ring, so extends to form an angle ($\alpha$) with an axis of one of the output shaft (7) of the secondary cone (6) and a shaft (5) of the primary cone (4).

18. The cone ring transmission according to claim 1, wherein the start-up element (2) is one of a dry clutch or a wet disk clutch (2').

19. The cone ring transmission according to claim 1, wherein the start-up element is provided with a torsion damper.

20. The cone ring transmission according to claim 1, wherein the auxiliary gear train (10) enabling reverse motion is at least partially placed within the secondary cone (6).

21. A cone ring transmission for a transverse installation in a motor vehicle, the transmission comprising a primary rotating cone placed upon a first shaft (5), which is arranged in opposite alignment with a secondary rotating cone, placed on an output shaft (7), an adjustment ring, engages both of the primary and the secondary rotating cones and circumferentially encompasses one of the primary and the secondary rotating cones, the adjustment ring further has an apparatus for the adjustment of ratios, and with an arrangement which the output shaft of the secondary cone with a differential of the motor vehicle and has a start-up element which binds one of the primary and the secondary rotating cones with a motor of the motor vehicle, torque from the output shaft (7) of the secondary cone (6) is transmitted to the differential (9) by a chain drive, between the chain drive and the differential (9) in a direction of power flow, one or more of a planetary gear set (3) and an auxiliary gear train (10) is installed.

* * * * *